United States Patent
Kurokawa et al.

(10) Patent No.: US 9,219,368 B2
(45) Date of Patent: Dec. 22, 2015

(54) CHARGE CONTROLLER WITH PROTECTION FUNCTION AND BATTERY PACK

(71) Applicant: MITSUMI ELECTRIC CO., LTD., Tama-shi, Tokyo (JP)

(72) Inventors: Gentaro Kurokawa, Atsugi (JP); Daisuke Suzuki, Atsugi (JP); Junji Takeshita, Atsugi (JP)

(73) Assignee: MITSUMI ELECTRIC CO., LTD., Tokyo (JP)

( * ) Notice: Subject to any disclaimer, the term of this patent is extended or adjusted under 35 U.S.C. 154(b) by 328 days.

(21) Appl. No.: 13/748,138

(22) Filed: Jan. 23, 2013

(65) Prior Publication Data

US 2013/0193924 A1 Aug. 1, 2013

(30) Foreign Application Priority Data

Jan. 25, 2012 (JP) ................................ 2012-013395

(51) Int. Cl.
H02J 7/00 (2006.01)
H02J 7/04 (2006.01)

(52) U.S. Cl.
CPC .............. *H02J 7/0029* (2013.01); *H02J 7/045* (2013.01); *H02J 2007/004* (2013.01); *H02J 2007/0037* (2013.01)

(58) Field of Classification Search
USPC ......... 320/106, 112, 116, 127, 134, 148, 162, 320/164
See application file for complete search history.

(56) References Cited

U.S. PATENT DOCUMENTS 3,590,358 A 6/1971 Ruben
5,583,384 A 12/1996 Henry
5,825,155 A * 10/1998 Ito et al. ...................... 320/118
(Continued)

FOREIGN PATENT DOCUMENTS

JP 10290530 A 10/1998
JP 2000-092735 A 3/2000
(Continued)

OTHER PUBLICATIONS

Related U.S. Appl. No. 13/748,174; Gentaro Kurokawa; Charge Controller With Protection Function and Battery Pack; filed: Jan. 23, 2013.
(Continued)

*Primary Examiner* — Brian Ngo
(74) *Attorney, Agent, or Firm* — Holtz, Holtz, Goodman & Chick PC (57) ABSTRACT

A charge controller includes a charge control circuit which controls a charging transistor; and a protection circuit that, when the secondary battery is over-discharged, turns off the first control switch element to block discharge current and when the secondary battery is overcharged, turns off the second control switch element to prevent the charge current from flowing. The charge control circuit includes a function of control for applying constant charge current through the charging transistor until the voltage of the secondary battery reaches a predetermined value and switching to control for applying charge current at a constant voltage after the voltage of the secondary battery reaches the predetermined value, and a terminal voltage on the positive electrode side and a terminal voltage on the negative electrode side of the secondary battery are supplied as monitoring voltage to the charge control circuit.

4 Claims, 10 Drawing Sheets

(56) References Cited

U.S. PATENT DOCUMENTS

| | | |
|---|---|---|
| 5,831,350 A | 11/1998 | McConkey et al. |
| 5,903,137 A | 5/1999 | Freiman et al. |
| 7,215,096 B2 | 5/2007 | Miura et al. |
| 7,394,224 B2 | 7/2008 | Wanibuchi et al. |
| 2007/0216351 A1 | 9/2007 | Seki et al. |
| 2008/0074081 A1 | 3/2008 | Croman et al. |
| 2008/0111520 A1* | 5/2008 | Sasaki .......................... 320/134 |
| 2009/0220825 A1 | 9/2009 | Nakashima et al. |
| 2010/0231175 A1* | 9/2010 | Noda .......................... 320/162 |
| 2011/0273145 A1 | 11/2011 | Yamakita et al. |
| 2011/0279095 A1 | 11/2011 | Hong et al. |

FOREIGN PATENT DOCUMENTS

| | | |
|---|---|---|
| JP | 2004-296165 A | 10/2004 |
| JP | 2005192383 A | 7/2005 |
| JP | 2007097242 A | 4/2007 |
| JP | 2008017542 A | 1/2008 |
| JP | 2011115012 A | 6/2011 |

OTHER PUBLICATIONS

Non-Final Office Action dated Mar. 13, 2015, issued in related U.S. Appl. No. 13/748,174.

Japanese Office Action (and English translation thereof) dated Sep. 29, 2015, issued in Japanese Application No. 2012-013393.

Japanese Office Action (and English translation thereof) dated Nov. 4, 2015, issued in counterpart Japanese Application No. 2012-013395.

* cited by examiner

CHARGE CONTROLLER WITH PROTECTION FUNCTION AND BATTERY PACK

BACKGROUND OF THE INVENTION

1. Field of the Invention

The present invention relates to a secondary battery charge controller including a protection function against overcharge and over-discharge and relates to an effective technique used for example, in a charge controller incorporated in a lithium-ion battery pack and a semiconductor integrated circuit for the charge controller.

2. Description of the Related Art

In secondary batteries such as lithium-ion batteries, overcharge or over-discharge reduces the battery lifetime. Accordingly, the conventional secondary batteries of mobile phones and the like are often composed as battery packs each incorporating a protection semiconductor integrated circuit (hereinafter, referred to as a protection IC) together with a battery cell in a single case, the protection IC having a protection function against overcharge and over discharge.

In the case of using the aforementioned battery pack, the main device is provided with a charge-controlling semiconductor integrated circuit (hereinafter, referred to as a charge control IC) for charging a secondary battery by voltage from a DC current power supply (a charging power supply) such as an AC adaptor.

One of the inventions concerning a charge controller composed of a protection IC and a charge control IC as described above is disclosed in Japanese Patent Laid-open Publication No. 2000-92735 (Japanese Patent No. 4003311), for example. In another proposed invention, a protection IC and a charge control IC are incorporated in a battery pack (Japanese Patent Laid-open Publication No. 2004-296165).

Figure 9:
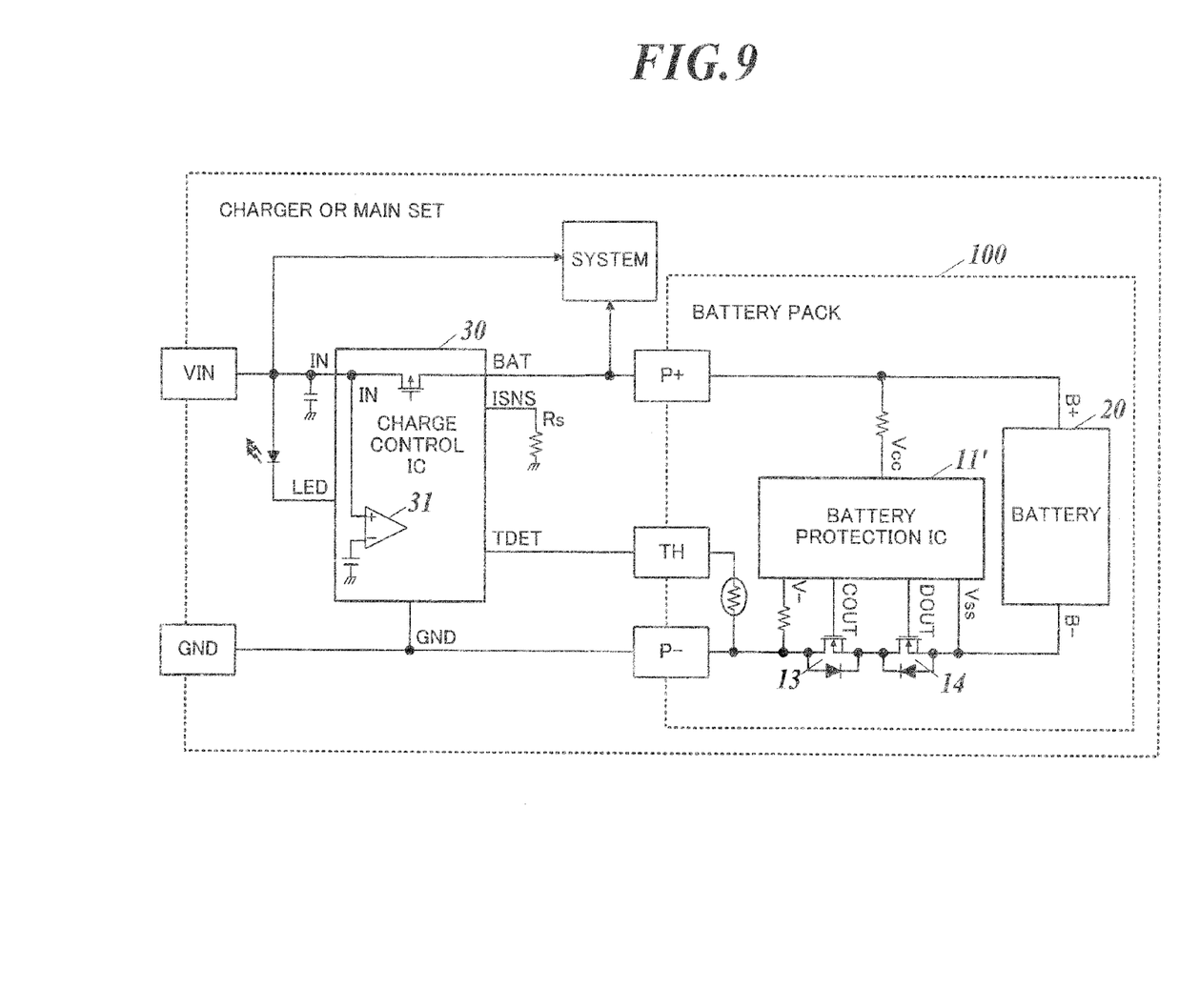
FIG. 9 is a circuit diagram illustrating a configuration example of a conventional-type battery pack including a charge control IC and a protection IC.

FIG. 9 illustrates a configuration example of a charge controller including: a conventional battery pack incorporating a protection IC; and a charge control IC charging the battery pack.

A battery pack 100 of FIG. 9 includes a protection IC 11' equipped with a protection function against overcharge or over-discharge. The battery pack 100 includes, in addition, a charge control FET (a field-effect transistor) 13 and a discharge control FET 14, which are provided in series between a terminal P– connected to a charging power supply (an AC adaptor) and a terminal B– on the negative electrode side of the secondary battery 20. The protection IC 11' is configured to turn off the charge control FET 13 when the battery voltage reaches a predetermined voltage (about 4.275 V in the case of a lithium ion battery) or higher after charging starts.

In the invention described in Japanese Patent Laid-open Publication No. 2000-92735 (Japanese Patent No. 4003311), when the battery voltage reaches a predetermined voltage (about 4.2 V in the case of a lithium ion battery) after charging starts, the charge control IC 30 switches the control from constant-current charge to constant-voltage charge.

In a charge controller including: a charge control IC; and a battery pack incorporating a protection IC as shown in FIG. 9, the charge control IC monitors voltage across terminals P+ and P– of the battery pack 100 for constant-current charge control and constant-voltage charge control. However, in this case, the voltage across the terminals P+ and P– of the battery pack monitored by the charge control IC is higher than voltage across the terminals B+ and B– of the battery cell 20 by the impedances of the charge control FET 13 and the discharge control FET 14 and the like.

Figure 10A:
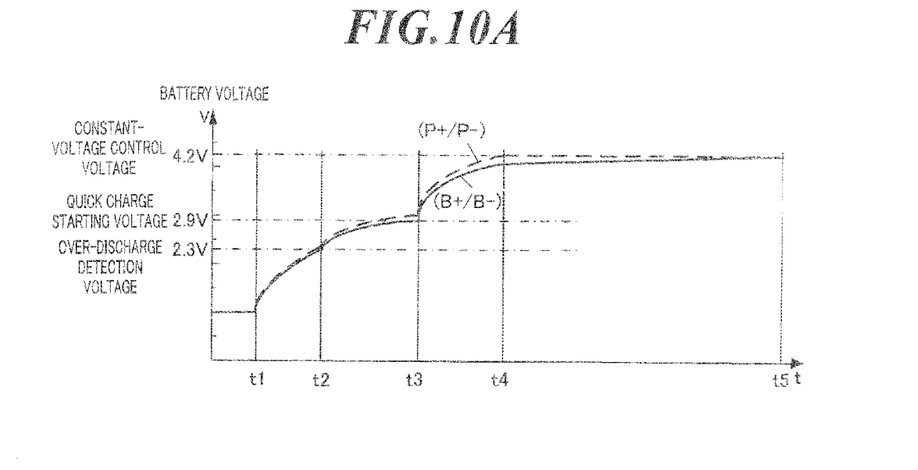
FIG. 10A is a timing diagram for explaining changes in battery voltage of the conventional-type battery pack including the protection IC.
Figure 10B:
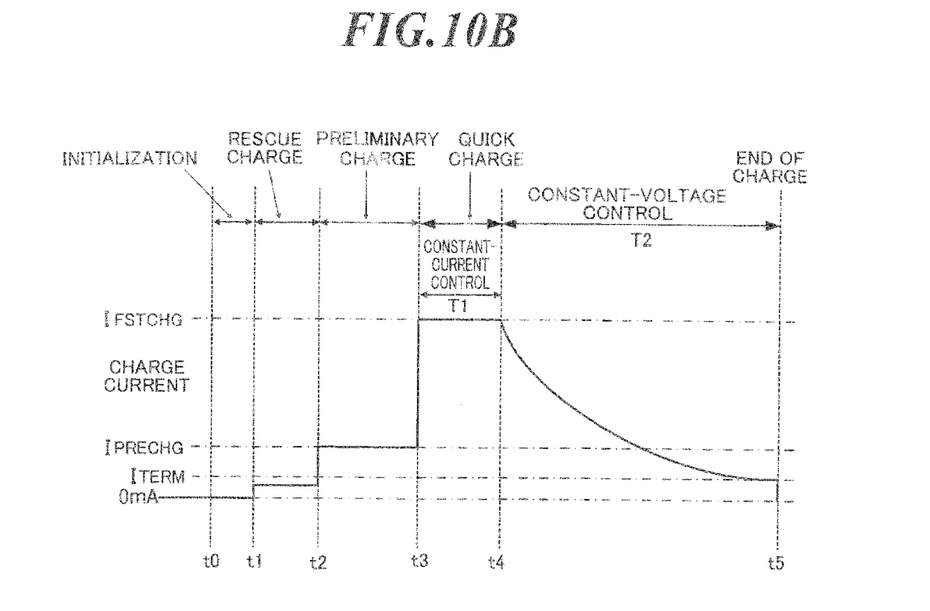
FIG. 10B is a timing diagram for explaining changes in charge current of the conventional-type battery pack including the protection IC.

Accordingly, if the charge control IC is designed so as to switch from constant-current charge to constant-voltage charge based on the voltage across the terminals P+ and P– of the battery pack 100 when the voltage across the terminals P+ and P– reaches 4.2 V, for example, as shown in FIG. 10A, the switching takes place when the voltage across the terminals B+ and B– of the battery cell 20 is still about 4.15 V (at timing t4). The voltage across the terminals B+ and B– of the battery cell 20 then gradually increases by the constant-voltage charge, and the voltage across the terminals B+ and B– of the battery cell 20 gets close to the voltage across the terminals P+ and P– of the battery pack 100 while the charge current decreases. As shown in FIG. 10B, when the charge current decreases to a predetermined current value (at timing t5), the charge control IC 30 turns off the charging transistor 31 to terminate the charge.

Herein, in characteristic curves of changes in voltage in FIG. 10A, the solid line represents the voltage across the terminals (B+, B–) of the battery cell, and the dashed line represents the voltage across the terminals (P+, P–) of the battery pack.

If the charge control IC is configured to switch from constant-current charge to constant-voltage charge based on the voltage across the terminals P+ and P– of the battery pack 100, as shown in FIG. 10B, timing t4 of switching from constant-current charge (quick charge) to constant-voltage charge comes earlier. Accordingly, constant-current charge period T1 is shortened, and subsequent constant-voltage charge period T2 is lengthened. The total required charge time (t1-t5) is therefore lengthened.

In the invention of Japanese Patent Laid-open Publication No. 2000-92735 (Japanese Patent No. 4003311) described above, the protection IC 11' monitors the voltage across the terminals B+ and B– of the battery cell 20 and, when the cell voltage reaches a predetermined voltage, sends a signal to the charge control IC 30 from the protection IC 11' for switching from constant-current charge to constant-voltage charge. In such a case, however, it is necessary to provide a comparator to detect the timing to switch from constant-current charge to constant-voltage charge for the protection IC. Moreover, it is necessary to provide a terminal to send the signal and a terminal to receive the signal for the protection IC and charge control IC.

In a conventional charge controller including a protection IC and a charge control IC, the protection IC has a function of turning off the charge control FET 13 at a predetermined overcharge detection voltage (about 4.275 V in the case of a lithium-ion battery) to protect a secondary battery from overcharge. On the other hand, the charge control IC switches from constant-current charge to constant-voltage charge at a predetermined voltage (about 4.2 V in the case of a lithium-ion battery) as described above. The switching of the controls is performed in such a manner that each IC uses a comparator to compare reference voltages with the battery cell voltage or terminal voltage of the battery pack to detect the timing to switch.

If the protection circuit and the charge control circuit are composed of different ICs, the reference voltages generated by the reference voltage generating circuits provided for the respective ICs are varied in opposite directions in some cases because of variations in manufacturing process. In such case, if the reference voltages of each IC are set to values close to each other, and the reference voltage of the protection IC is shifted to a lower value and the reference voltage of the charge control IC is shifted to a higher value, the ranges of detection voltages varied because of the shifts of the reference voltages overlap each other in some cases. The variation in each reference voltage is individually about +/−0.025 V.

When the overcharge detection voltage of the protection IC is lower than the constant-voltage charge switching voltage of the charge control IC, the protection IC detects that the battery voltage exceeds the overcharge detection voltage and turns off the charge control FET before the charge control IC detects that the battery voltage exceeds the constant-voltage charge switching voltage. Accordingly, the charge control IC cannot acknowledge that the charge control FET is turned off, thus causing a situation whereby the charge is not completed.

Figure 6A:
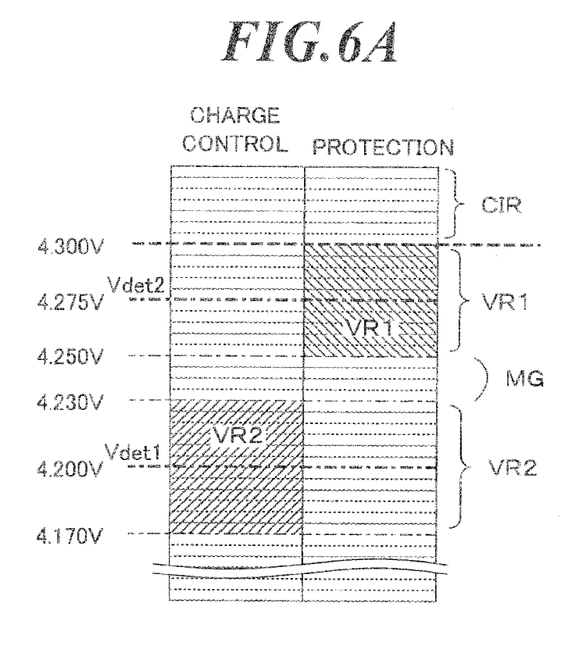
FIG. 6A is an explanatory view showing examples of detection voltages for constant-voltage charge control and overcharge protection control in a conventional charge controller.

Accordingly, in a charge controller of a conventional lithium-ion battery, as shown in FIG. 6A, for example, the overcharge detection voltage Vdet2 of the protection IC is set to 4.275 V, and the constant-voltage charge switching voltage Vdet1 of the charge control IC is set to 4.200 V. This can provide a margin of about 0.02 V so that the variation ranges of reference voltages do not overlap each other even if the reference voltages vary. Herein, the overcharge detection voltage Vdet2 of the protection IC is set to 4.275 V because the charge inhibit region of lithium-ion batteries is equal to or more than 4.3 V and the variation of the reference voltage on one side which is 0.025 V is subtracted from the above voltage (4.3 V).

However, when the overcharge detection voltage Vdet2 of the protection IC and the constant-voltage charge switching voltage Vdet1 of the charge control IC have a large 0.075 V difference, the charge control IC often terminates charge control before the battery is actually fully charged, thus causing a problem of reduction in apparent battery capacity.

Moreover, it is known that while being charged, secondary batteries generate heat. When the amount of generated heat increases to raise the battery cell temperature, charge current is controlled according to the temperature for protecting the battery cell.

In a conventional battery charger which includes a protection IC and a charge control IC and is provided for a mobile phone or the like, for example, a thermistor is provided for the battery pack. In the battery charger, a signal according to change in temperature of the thermistor is sent to the charge control IC provided in the main device, and as the battery cell temperature rises or falls, control such as reducing charge current or reducing charge voltage is performed. In another case, the protection IC is provided with an element within the chip, the element changing with temperature in characteristic, such as a resistance, and based on the change in characteristic of the element, the overcharge detection voltage or the over-current detection voltage are changed so that the protection point is shifted.

However, if the charge control IC and the protection IC are configured to change the controls according to the respective conditions of the different temperature detection elements, the temperature detection elements have different temperature characteristics and different variations thereof.

Figure 7A:
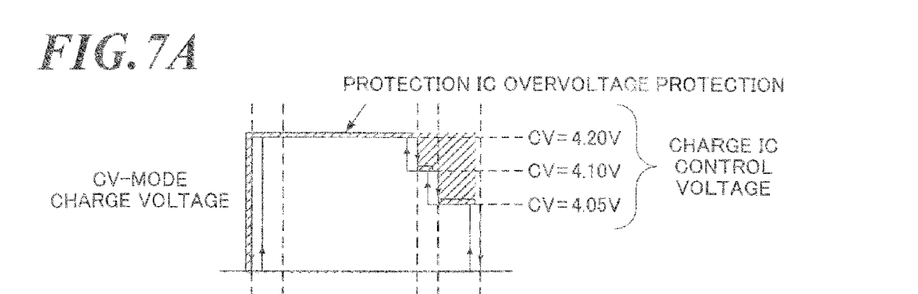
FIG. 7A is an explanatory view showing adjustment of overcharge detection voltage and over-current detection voltage according to ambient temperature by the protection IC in the conventional charge controller.

As shown in FIG. 7A, therefore, the detection values by the protection IC concerning the overcharge protection and the over-current protection are deviated from the current-control switching voltage CV and the detection value concerning over-current protection by the charge control IC. If the charge control IC detects over-current prior to the protection IC, for example, the charge is stopped even in a chargeable temperature range, and the apparent battery capacity is reduced in some cases.

Moreover, if the protection IC detects the overcharge prior to the charge control IC and turns off the charge control FET, for example, the charge control IC cannot acknowledge that the charge control FET is turned off and could determine that the battery has failed, continue the control to apply charge current, or stop charging even in the chargeable temperature range.

Figure 7B:
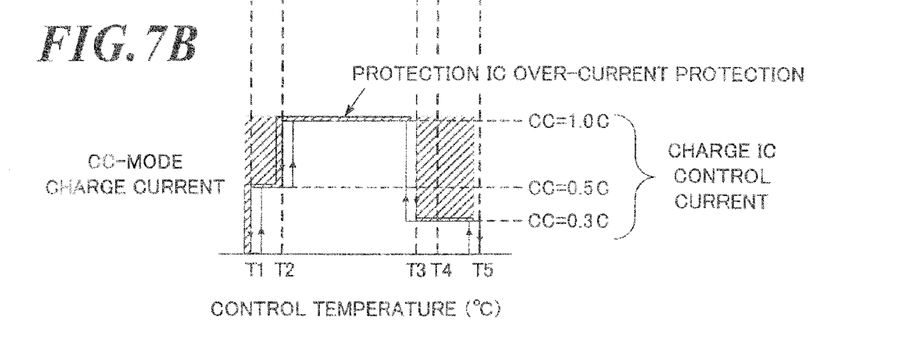
FIG. 7B is an explanatory view showing adjustment of current-control switching voltage (including overcharge detection) and over-current detection voltage according to ambient temperature by the charge control IC in the conventional charge controller.

FIG. 7A shows the relationship between temperature adjustment of the detection voltage concerning overcharge protection in the protection IC and temperature adjustment of the voltage CV for switching from constant-current charge control to constant-voltage charge control in the charge control IC. FIG. 7B shows the relationship between temperature adjustment of the detection current concerning overcharge protection in the protection IC and temperature adjustment of charge control current CC in the charge control IC. In FIGS. 7A and 7B, the horizontal axis indicates temperature, and the temperature increases from left to right.

SUMMARY OF THE INVENTION

The present invention was made on the aforementioned background, and an object of the present invention is to provide a charge controller and a charge controlling semiconductor integrated circuit with the total required charge time shortened by delaying the timing to switch from constant-current charge (quick charge) to constant-voltage charge to shorten the subsequent period of constant-voltage charge.

Another object of the present invention is to provide a charge controller which is capable of increasing the battery capacity while preventing the situation in which because of the variation in reference voltage, the charge control IC terminates charging control before the battery is overcharged and the battery is not completely charged.

Still another object of the present invention is to provide a charge controller capable of ensuring the battery capacity to a maximum extent while avoiding degradation of the battery performance and lifetime in the case where the charge control circuit and the protection circuit are individually equipped with adjustment functions against changes in the temperature of the battery.

According to an aspect of the present invention, there is provided a charge controller with a protection function, including:

a charging transistor configured to apply charge current to a secondary battery;

a charge control circuit which controls to cause the charging transistor to apply the charge current when a charging power supply is connected;

a first control switch element and a second control switch element connected in series between one terminal of the secondary battery and an external terminal; and a protection circuit that, when the secondary battery is over-discharged, turns off the first control switch element to block discharge current and when the secondary battery is overcharged, turns off the second control switch element to prevent the charge current from flowing into the secondary battery, wherein the charge control circuit includes a function of control for applying constant charge current through the charging transistor until the voltage of the secondary battery reaches a predetermined value and switching to control for applying charge current at a constant voltage after the voltage of the secondary battery reaches the predetermined value, and the same potential as a terminal voltage on a positive electrode side and a terminal voltage on a negative electrode side of the secondary battery are supplied to the charge control circuit.

Preferably, the charge controller with a protection function further includes:

a line which transmits reference voltage generated by a reference voltage generator of the charge control circuit or a reference voltage generator of the protection circuit, to the protection circuit or the charge control circuit, wherein based on the transmitted reference voltage, the protection circuit or the charge control circuit detects overcharge or the timing to switch from constant-current charge control to constant-voltage charge control.

Preferably, the charge controller with a protection function, further includes a temperature detection element to which a bias is applied by the charge control circuit or the protection circuit, wherein a signal indicating a change in characteristics of the temperature detection element with a change in temperature is supplied to the charge control circuit and the protection circuit.

Preferably, in the charge controller with a protection function, the charge control circuit and the protection circuit are formed as a semiconductor integrated circuit on one semiconductor chip.

Preferably, there is provided a battery pack, including: a charge controller; and a battery cell connected to the charge controller, wherein the charge controller and the battery cell are accommodated in one case.

DESCRIPTION OF THE PREFERRED EMBODIMENTS

Hereinafter, a description is given of a preferred embodiment of the present invention based on the drawings.

Figure 1:
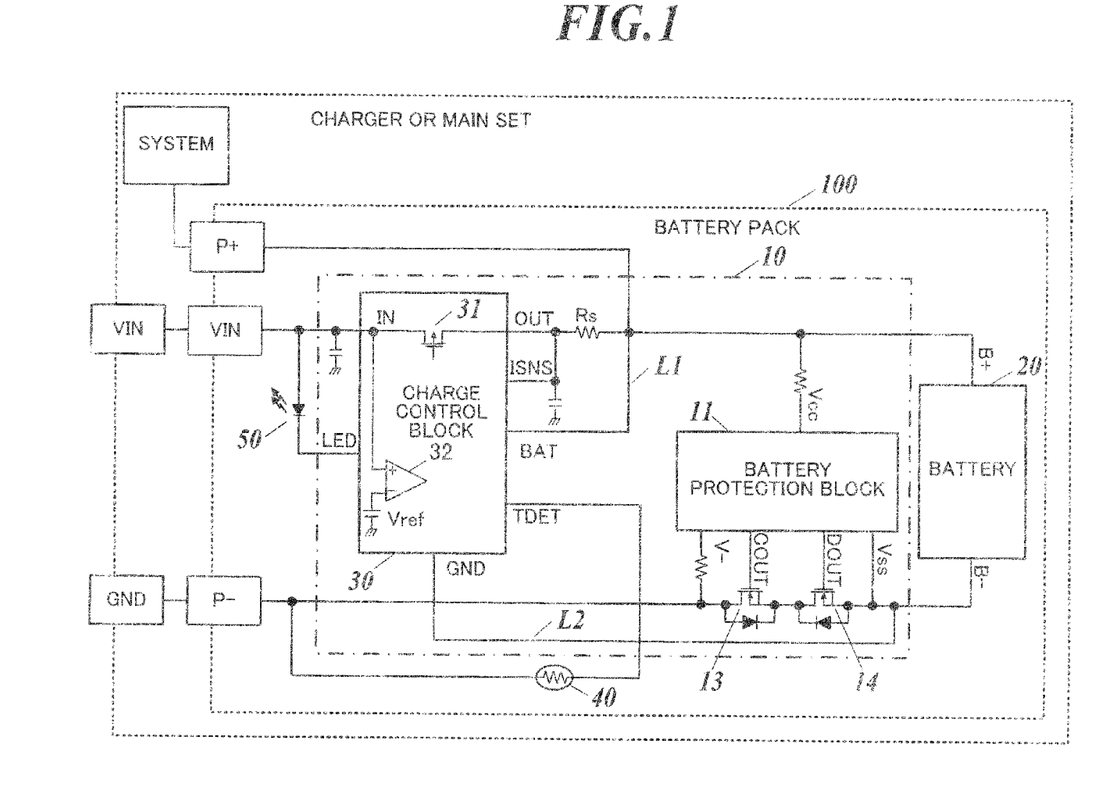
FIG. 1 is a circuit block diagram illustrating an embodiment of a battery pack incorporating a charge control IC according to the present invention.

FIG. 1 illustrates an embodiment of a battery pack including a charge controller to which the present invention is applied. The element constituting a circuit of the portion surrounded by a dashed-dotted line in FIG. 1, but not limited to, is formed on one semiconductor chip and is composed as a semiconductor integrated circuit (a charge control IC with a protection function) 10.

A battery pack 100 in this embodiment includes a charge control IC 10 with a protection function; a secondary battery (hereinafter, a battery cell) 20 such as a lithium-ion battery; a thermistor 40 for temperature detection; and a LED 50 showing that the battery cell 20 is being charged.

The charge control IC 10 with a protection function includes a protection block 11, a charging transistor 31, a charge control block 30, a charge control FET 13 and a discharge control FET 14. The protection block 11 is equipped with a protection function against overcharge, overdischarge, and the like. The charging transistor 31 is composed of a P-channel MOSFET (an insulated gate-type field effect transistor) connected between a voltage input terminal VIN of the battery pack 100 and a terminal B+ on the positive electrode side of the battery cell 20. The charge control block 30 controls the charging transistor 31. The charge control FET 13 and the discharge control FET 14 composed of N-channel MOSFETs are provided in series between a terminal B− on the negative electrode side of the battery cell 20 and a terminal P− on the negative electrode side of the battery pack 100 and are controlled by the protection block 11.

The charge control block 30 includes a comparator 32 for detecting whether a charging power supply (an AC adaptor) is connected to the voltage input terminal VIN. When the comparator 32 detects that the AC adaptor is connected, the charge control block 30 turns on the charging transistor 31 to start charging the battery cell 20. The comparator 32 detects whether the AC adaptor is connected by comparing reference voltage Vref with voltage of the voltage input terminal VIN of the battery pack 100 or a fraction of the same.

The charge control block 30 includes: a function of charging the battery cell 20 with constant current while monitoring voltage across the terminals of a sense resistor Rs for current detection, the sense resistor Rs being provided in series to the charging transistor 31; and a function of charging the battery cell 20 with a constant voltage while monitoring voltage of a terminal BAT, to which the voltage of terminal B+ of the battery cell 20 is inputted.

Figure 2A:
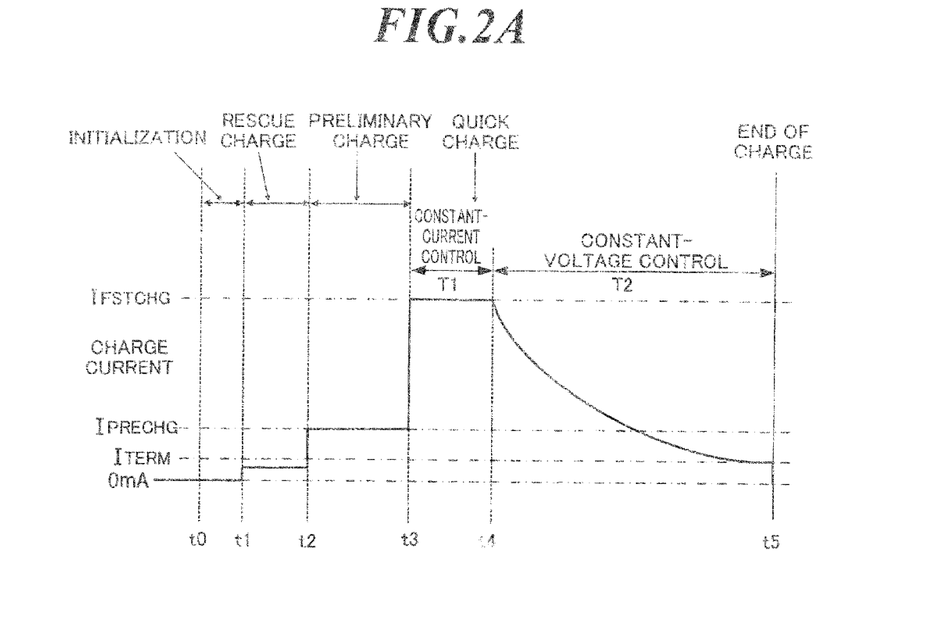
FIG. 2A is a timing diagram showing timing to switch from constant-current control to constant-voltage control by a conventional charge control IC.
Figure 2B:
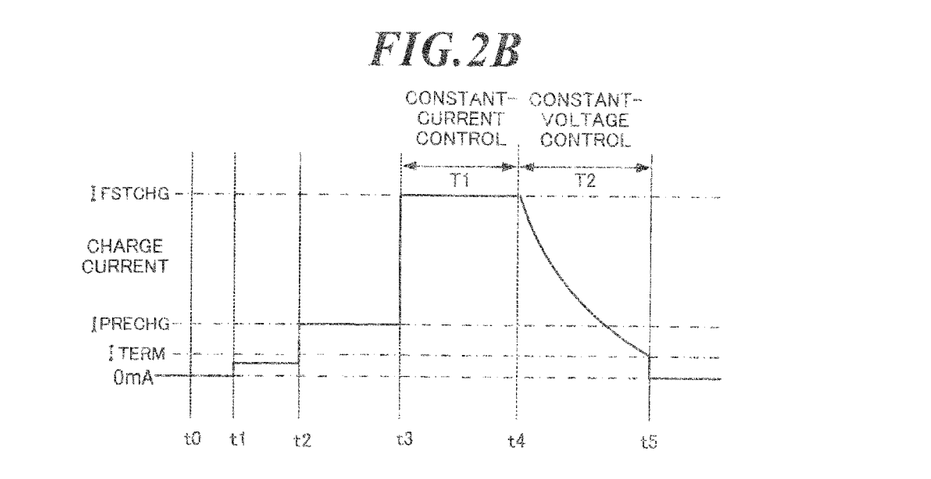
FIG. 2B is a timing diagram showing timing to switch from constant-current control to constant-voltage control by the charge control IC of the embodiment of the present invention.

Specifically, the charge control block 30 controls the charging transistor 31 and, as shown in FIGS. 2A and 2B, first performs rescue charge (t1-t2) to gradually charge while determining whether the battery cell is normal. The charge control block 30 then performs preliminary charge (t2-t3) with a current value of about 10% of that during the quick charge. When the battery voltage reaches 2.9 V (at timing t3), the charge control block 30 switches to constant-current charge (quick charge). When the battery voltage then reaches 4.2 V (at timing t4), the charge control block 30 switches to constant-voltage charge and continues charging. Upon detecting completion of charge (detecting that the charge current is reduced to a predetermined value or less, for example), the charge control block 30 turns off the charging transistor 31 to terminate the charge (at timing t5).

The charge control block 30 further includes: a function of applying a current or a voltage as bias to the thermistor 40 for temperature detection and stopping charging when determining that the detected temperature is abnormal; and a function of stopping charging when detecting overvoltage based on the voltage of the terminal BAT. The charge control block 30 still further includes: a function of monitoring the voltage of a terminal ISNS connected to the sense resistor Rs and stopping charging when detecting overcharge current; a function of lighting up the external LED 50 during the charge control to show that the battery cell 20 is being charged; and the like.

To enable the charge control block 30 to directly monitor the battery voltage, the battery pack of the embodiment is provided with a line L1 for transmitting a potential of the terminal B+ on the positive electrode side of the battery cell 20 to the charge control block 30 and a line L2 for transmitting a potential of the terminal B− on the negative electrode side of the battery cell 20 to the charge control block 30.

The protection block 11 includes an overcharge protection function and an over-discharge protection function. The overcharge protection function is to protect the battery by turning off the charge control FET 13 when the battery voltage reaches a predetermined voltage (about 4.275 V in the case of a lithium-ion battery) or higher after turning on the charge control FET 13 to start charging. The over-discharge protection function is to protect the battery by turning off the discharge control FET 14 when detecting over-discharge (about 2.3 V or lower in the case of a lithium-ion battery) after the battery pack is connected to a load to start discharging the battery cell 20.

The protection block 11 can also include a deep-discharge protection function of turning off both the charge control FET 13 and the discharge control FET 14 to inhibit charge and discharge when detecting that the battery is deeply discharged (for example, about 1.0 V or lower). When the battery is just over-discharged, the protection block 11 turns off the discharge control FET 14 and turns on the charge control FET 13.

In a conventional charger illustrated in FIG. 9, the charge control IC 30 monitors voltage across the terminals P+ and P− of the battery pack 100 to perform the control of switching from constant-current charge to constant-voltage charge, so that the charge control IC performs the control of switching based on voltage which is higher than actual battery cell voltage by a voltage drop due to the impedances of the FETs 13 and 14 and the like. Accordingly, the constant-current charge is switched to the constant-voltage charge when the battery voltage is still lower than the target potential. As a result, as shown in FIG. 2A, the timing t4 to switch from constant-current charge to constant-voltage charge comes earlier. Accordingly, quick charge period T1 is shortened, and constant-voltage charge period T2 is lengthened. The total required charge time (t1-t5) is therefore increased.

On the other hand, the battery pack of this embodiment is provided with the lines L1 and L2 as described above. Accordingly, the charge control block 30 can directly monitor the terminal voltage of the battery cell 20 to switch the charge control mode. As shown in FIG. 2B, therefore, the timing t4 to switch from quick charge (constant-current charge) to constant-voltage charge can be delayed compared to the conventional battery pack shown in FIG. 9. Accordingly, quick charge period T1 is lengthened, and constant-voltage charge period T2 is shortened. The total required charge time (t1-t5) can be therefore reduced.

Moreover, in this embodiment, the charge control block 30 as a charge control circuit and the protection block 11 as a protection circuit are formed as a semiconductor integrated circuit on one semiconductor chip. Accordingly, the charge controller and the battery cell can be easily accommodated in one case and composed as a battery pack. Moreover, it is unnecessary to provide external terminals through which the signal representing the timing to switch from constant-current charge to constant-voltage charge is sent and received between the protection circuit and the charge control circuit, thus preventing an increase in number of external terminals due to the reduction in required charge time.

Moreover, the charge controller having the above-described configuration and the battery cell connected to the charge controller are accommodated in one case as a battery pack. It is therefore possible to start charging without incorporating a charge sequence of gradually charging while determining whether the battery cell is normal called battery wake-up, rescue charge, force charge, and the like. Moreover, the charge control circuit is provided within the case, thus enabling non-contact charge. Furthermore, in the case where the charge controller has a function of stopping charging when abnormal temperature is detected by a thermistor provided for the charge controller, the battery pack does not need to be provided with a terminal to output a signal indicating the condition of the thermistor, thus enabling reduction in number of terminals.

[Modifications]

Figure 3:
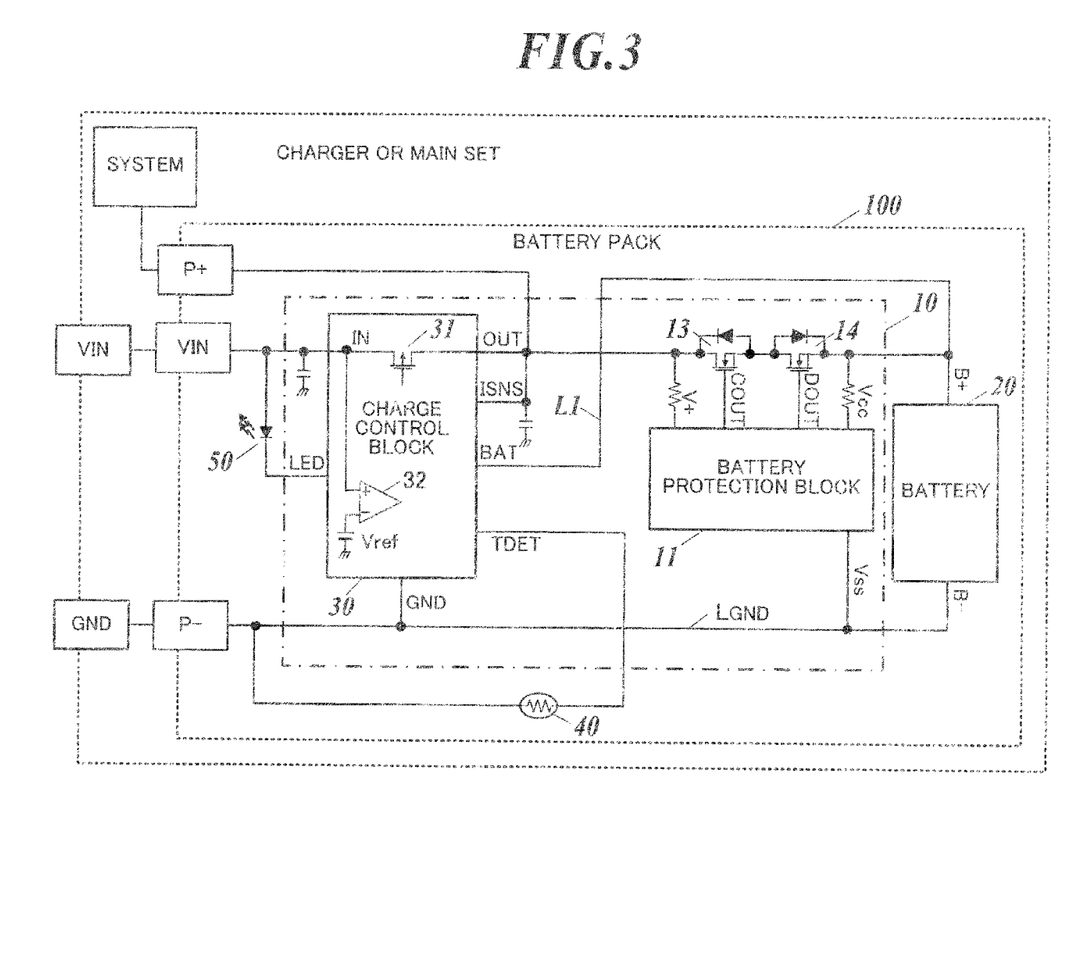
FIG. 3 is a circuit block diagram illustrating a first modification of the charge control IC of the embodiment of the present invention.

FIG. 3 illustrates a first modification of the battery pack 100 of the embodiment. The battery pack 100 of the embodiment of FIG. 1 is an application of low-side control in which the charge control FET 13 and the discharge control FET 14 each composed of a P-channel type MOSFET, are provided for the terminal B− on the negative electrode side of the battery cell 20 to be controlled by the protection block 11. On the other hand, the battery pack 100 of the modification of FIG. 3 is an application of high-side control in which the charge control FET 13 and the discharge control FET 14 are provided for the terminal B+ side on the positive electrode side of the battery cell 20 to be controlled by the battery protection block 11. The charge control FET 13 and the discharge control FET 14 may be composed of N-channel type MOSFETs.

In the modification, the line L1 is provided, which directly transmits the potential of the electrode terminal B+ on the positive electrode side of the battery cell 20 to the charge control block 30. The terminal B− on the negative electrode side of the battery cell 20 is connected to a ground potential line LGND common to the protection block 11 and the charge control block 30. The charge control block 30 can acknowledge the potentials of the terminal B+ on the positive electrode side and the terminal B− on the negative electrode side of the battery cell 20.

In the modification of FIG. 3, the voltage monitored by the charge control block 30 is taken out near the terminal B+ on the positive electrode side of the battery cell 20 through the line L1. This can prevent the required charge time from the start to end of charge from being increased by a drop of the monitored voltage due to the impedances of the charge control FET 13 and the discharge control FET 14.

In the modification of FIG. 3, instead of the sense resistance Rs, a transistor forming a current mirror connection with the charging transistor 31 is provided within the charge control block 30, and current control is performed by applying current proportional to the charging current flowing through the charging transistor 31 to the current mirror circuit and detecting the current value thereof.

The functions of the protection block 11 and the charge control block 30 are the same as those of the embodiment of FIG. 1, and overlapping description is omitted.

Figure 4:
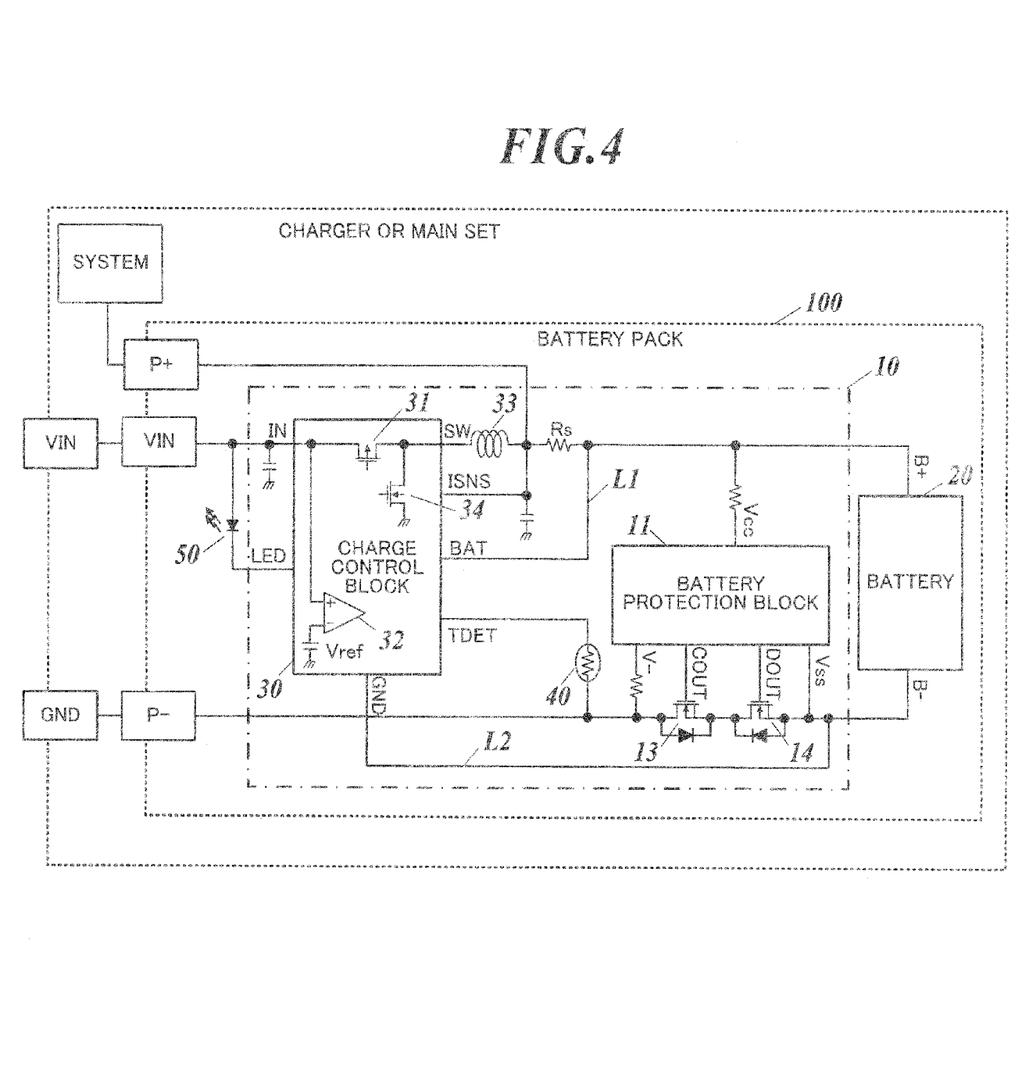
FIG. 4 is a circuit block diagram illustrating a second modification of the charge control IC of the embodiment of the present invention.

FIG. 4 illustrates a second modification of the battery pack 100 of this embodiment. In the battery pack 100 of the embodiment of FIG. 1, the charge control block 30 controls the charging transistor 31 in a linear control method. On the other hand, the battery pack 100 of the modification of FIG. 4 is configured as a switching regulator-type charge controller. Specifically, an inductor (coil) 33 is connected in series with the charging transistor 31, and a transistor (FET) 34 for synchronous rectification is provided between the ground and the connection node of the charging transistor 31 and the inductor 33. The charging transistor 31 and the transistor 34 for synchronous rectification are alternately turned on to apply the charge current.

In the modification, similarly to the embodiment of FIG. 1, the line L1 transmitting the potential of the terminal B+ on the positive electrode side of the battery cell 20 to the charge control block 30 and the line L2 transmitting the potential of the terminal B− on the negative electrode side of the battery cell 20 to the charge control block 30 are provided so that the charge control block 30 can directly monitor the battery voltage.

[Second Embodiment]

Figure 5:
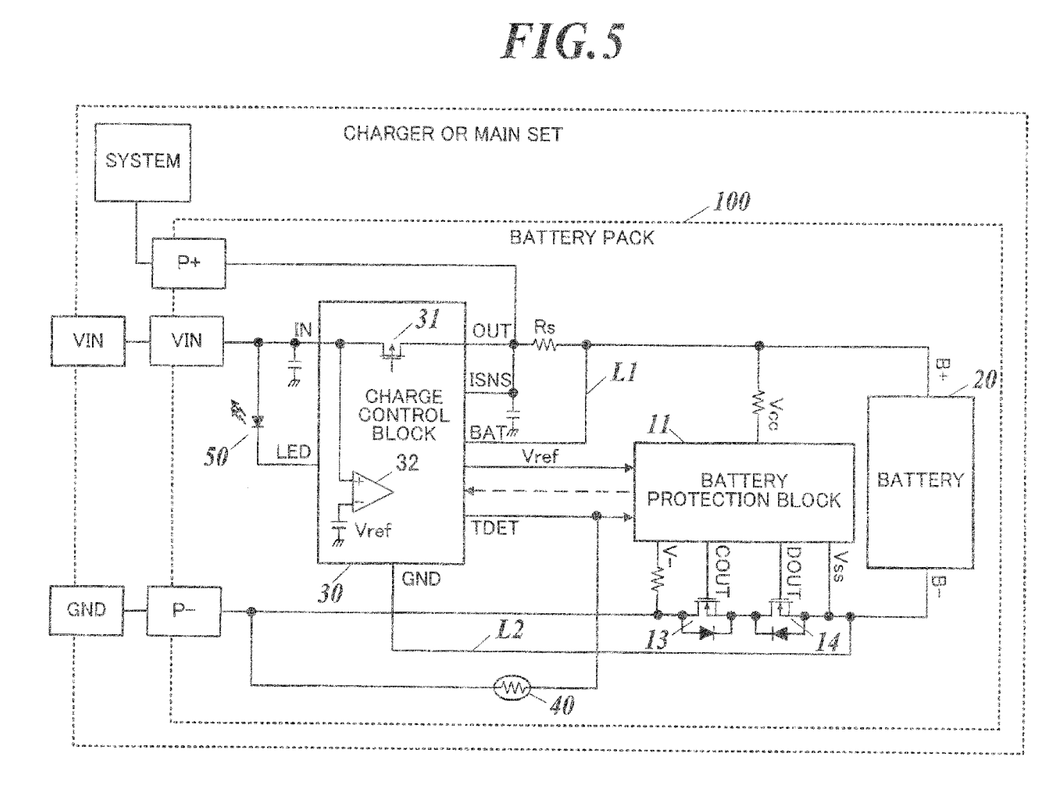
FIG. 5 is a circuit block diagram illustrating a second embodiment of a charge controller according to the present invention.

FIG. 5 illustrates a charge controller of a second embodiment according to the present invention.

The charge controller of the second embodiment has substantially the same configuration as the charge controller of the first embodiment shown in FIG. 1. The first difference between the charge controller of the second embodiment and the charge controller shown in FIG. 1 is that in the charge controller of the second embodiment, the reference voltage Vref generated by the charge control block 30 is transmitted to the protection block 11. The protection block 11 compares the reference voltage Vref from the charge control block 30 with the battery voltage for detecting overcharge, over-discharge, and the like. Moreover, the voltage to switch to the constant-voltage charge in the charge control block 30 is set higher.

The second difference is that in the charge controller of the second embodiment, a signal (voltage) obtained from the thermistor 40 to which the charge control block 30 applies a bias is also supplied to the protection block 11. The charge control block 30 and the protection block 11 individually adjust reference voltages according to the temperature of the battery pack and correct the overcharge detection level.

When the protection block 11 and the charge control block 30 are individually provided with different reference voltage generators, the variation in reference voltage of each reference voltage generator is larger in the case where the protection block 11 and the charge control block 30 are composed of different ICs than that in the case where the protection block 11 and the charge control block 30 are composed as a same IC. Accordingly, it is more effective to apply the second embodiment to the case where the protection block 11 and the charge control block 30 are composed of different ICs.

First, a description is given of the benefit of transmitting the reference voltage Vref generated in the charge control block 30 to the protection block 11 as the first difference.

Figure 6B:
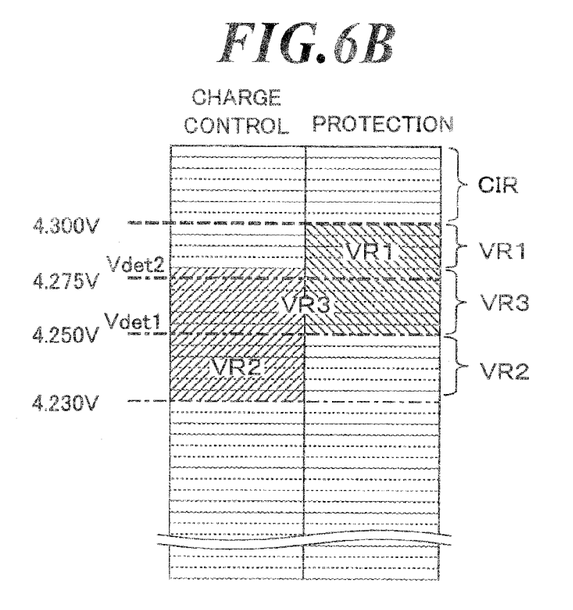
FIG. 6B is an explanatory view showing examples of detection voltages for constant-voltage charge control and overcharge protection control in the charge controller of the second embodiment of the present invention.

In this case, if the reference voltage Vref generated by the charge control block 30 varies, the constant-voltage charge switching voltage determined depending on the reference voltage and the overcharge detection voltage determined by the protection block 11 are shifted in the same direction with respect to the target values. Accordingly, as shown in FIG. 6B, even if the detection voltage is set so that the variation range of the constant-voltage charge switching voltage of the charge control block and the variation range of the overcharge detection voltage of the protection block overlap each other, that is, the margin as shown in FIG. 6A is eliminated, the protection block 11 does not detect that the battery voltage is higher than the overcharge detection voltage Vdet2 before the charge control block 30 detects that the battery voltage is higher than the constant-voltage charge switching voltage Vdet1.

It is therefore possible to prevent the situation in which the protection block 11 first detects that the battery voltage is higher than the overcharge detection voltage Vdet2 and turns off the charge control FET 13 to block the charging current flowing from the charge control block 30 to the secondary battery and the secondary battery is not completely charged. The voltage during the constant-voltage charge control can be set higher, thus enabling increase of the apparent battery capacity.

The similar operational effect to the above can be obtained in the case where the reference voltage generated by the protection block 11 is transmitted to the charge control block 30 as indicated by the dashed line of FIG. 5. Moreover, in the aforementioned configuration where the reference voltage is transmitted from one block to the other block, voltage supplied by dividing the monitored battery voltage through resistors in series may be also transmitted from the one block to the other block. This can implement voltage detection less affected by the variation in resistors for voltage division.

FIG. 6A is an explanatory view showing examples of detection voltages for constant-voltage charge control and overcharge protection control in the conventional charge controller. FIG. 6B is an explanatory view showing examples of detection voltages for the constant-voltage charge control and overcharge protection control in the charge controller of the second embodiment of the present invention. In FIG. 6A, CIR indicates a range of charge inhibit voltage; VR1 indicates a range of overcharge detection voltage in the protection IC (reference numeral 11' in FIG. 9); VR2 indicates a voltage range of constant-voltage control in the charge control IC (reference numeral in FIG. 9); and MG indicates a margin of voltage. In FIG. 6B, CIR indicates a range of charge inhibit voltage; VR1 indicates a range of overcharge detection voltage in the protection block (reference numeral 11 in FIG. 5); VR2 indicates a voltage range of constant-voltage control in the charge control block (reference numeral 30 in FIG. 5); and VR3 indicates a range of overcharge detection voltage in the protection block and a voltage range of constant-voltage control in the charge control block. In the voltage range VR3, the relationship of overcharge detection voltage>constant-voltage control voltage is guaranteed.

Next, a description is given of the benefit of supplying the protection block 11 with the signal (voltage) obtained from the thermistor 40 to which the charge control block 30 applies a bias, as the second difference.

FIGS. 7A and 7B show the relationship between temperature and each detection voltage or detection current in the case where the protection IC and the charge control IC adjust the overcharge detection voltage and the over-current detection current, and the current-control switching voltage and the over-current detection current based on the characteristics of the different temperature detection elements. On the other hand, FIGS. 8A and 8B show the relationship between temperature and each detection voltage or detection current in the case where the overcharge detection voltage and the over-current detection current, and the constant voltage charge switching voltage is adjusted in the battery pack (charge controller) of the third embodiment (FIG. 5) in which the signal of the thermistor 40, whose change in characteristics are obtained by the charge control block (IC) 30 applying a bias thereto, is also supplied to the protection block (IC) 11.

Figure 8A:
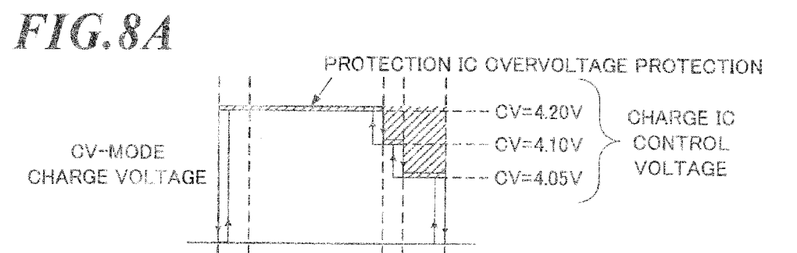
FIG. 8A is an explanatory view showing adjustment of overcharge detection voltage and over-current detection voltage according to ambient temperature by a protection IC in a charge controller of the third embodiment of the present invention.
Figure 8B:
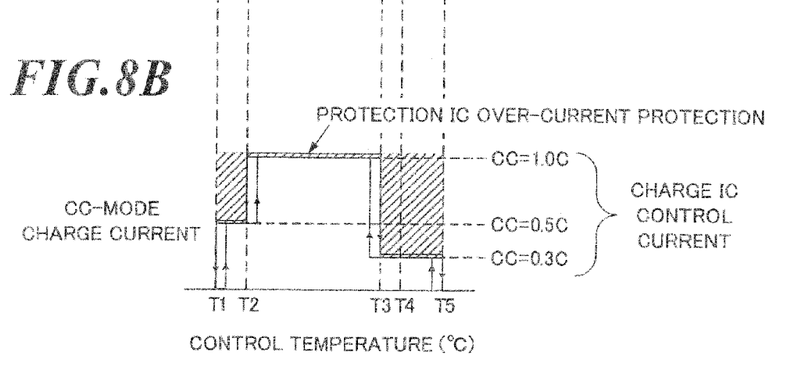
FIG. 8B is an explanatory view showing adjustment of current-control switching voltage (including overcharge detection) and over-current detection voltage according to ambient temperature by a charge control IC in the charge controller of the third embodiment of the present invention.

As understood from the comparison of FIGS. 7A and 7B with FIGS. 8A and 8B, in FIGS. 7A and 7B, if the temperature changes, the overcharge detection voltage and the over-current detection current in the protection IC are deviated from the current-control switching voltage CV and the over-current detection current CC in the charge control IC, respectively. On the other hand, in FIGS. 8A and 8B, even if the temperature changes, the overcharge detection voltage and the over-current detection current in the protection IC 11 are not deviated from the current-control switching voltage CV and the over-current detection current CC in the charge control IC, respectively.

It is therefore possible to prevent the situation in which the charge control IC first determines the over-current and reduces the charge current or stops charging even at the chargeable temperature range resulting in reduction of the apparent battery capacity.

Moreover, it is possible to prevent degradation of the battery performance and lifetime in the situation where the protection IC first detects overcharge and turns off the charge control FET while the charge control IC cannot acknowledge the fact that the charge control FET is turned off and determines that the battery has failed, continues the control to apply charge current, or stops charging.

In short, with the battery pack (charge controller) of the third embodiment (FIG. 5), it is possible to prevent degradation of the battery performance and lifetime and ensure the battery capacity to a maximum extent.

Instead of applying a bias to the thermistor 40 by the charge control block 30, it may be configured so that the bias to the thermistor 40 is applied by the protection block 11 and the signal from the thermistor 40 is also inputted to the charge control block 30.

The invention made by the inventor is specifically described based on the embodiments above. However, the present invention is not limited to the above embodiments. In the embodiments, for example, the protection block 11, the charge control block 30, the charge control FET 13 and the discharge control FET 14, and the charging transistor 31 are formed on one semiconductor chip to constitute a semiconductor integrated circuit as a whole. However, the protection block 11 and the charge control block 30 may be composed of different semiconductor integrated circuits. Moreover, the charge control FET 13 and the discharge control FET 14, the charging transistor 31, and the sense resistor Rs may be composed of external elements instead of on-chip elements.

Furthermore, the battery pack 100 of the embodiment includes the charge control block 30 and the charging transistor 31 and can charge by itself. Accordingly, the terminals VIN and P− of the battery pack may be connected to a non-contact charge module to constitute a system for charge by a non-contact method.

In the above embodiments, the charging transistor 31 controlled by the charge control block 30 is an FET but the transistor may be a bipolar transistor.

According to the present invention, it is possible to implement a charge controller and a charge control semiconductor integrated circuit with the total required charge time shortened by delaying the timing of switching from constant-current charge (quick charge) to constant-voltage charge to shorten the subsequent period of constant-voltage charge. Moreover, it is possible to implement a charge controller which is capable of increasing the battery capacity while preventing the situation in which because of the variation in reference voltage, the charge control IC terminates charge control before the battery is overcharged and the battery is not completely charged.

Still moreover, it is possible to implement a charge controller capable of ensuring the battery capacity to a maximum extent while avoiding degradation of the battery performance and lifetime in the case where the charge control circuit and the protection circuit are individually equipped with adjustment functions against changes with temperature in the battery.

The entire disclosure of Japanese Patent Application No. 2012-013395 filed on Jan. 25, 2012 including description, claims, drawings, and abstract is incorporated herein by reference in its entirety.

What is claimed is:

1. A charge controller with a protection function, comprising:
   a charging transistor configured to apply charge current to a secondary battery;
   a charge control circuit which controls to cause the charging transistor to apply the charge current when a charging power supply is connected;
   a first control switch element and a second control switch element connected in series between one terminal of the secondary battery and an external terminal; and
   a protection circuit that, when the secondary battery is over-discharged, turns off the first control switch element to block discharge current and when the secondary battery is overcharged, turns off the second control switch element to prevent the charge current from flowing into the secondary battery,
   wherein:
   the charge control circuit includes a function of control for applying constant charge current through the charging transistor until the voltage of the secondary battery reaches a predetermined value and switching to control for applying charge current at a constant voltage after the voltage of the secondary battery reaches the predetermined value, and a same potential as a terminal voltage on a positive electrode side and a terminal voltage on a negative electrode side of the secondary battery are supplied to the charge control circuit;
   the charge controller further comprises a line which transmits a reference voltage generated by a reference voltage generator of the charge control circuit or a reference voltage generator of the protection circuit, to the protection circuit or the charge control circuit; and
   based on the transmitted reference voltage, the protection circuit or the charge control circuit detects overcharge or the timing to switch from constant-current charge control to constant-voltage charge control.

2. The charge controller with a protection function according to claim 1, further comprising a temperature detection element to which a bias is applied by the charge control circuit or the protection circuit, wherein a signal indicating a change in characteristics of the temperature detection element with a change in temperature is supplied to the charge control circuit and the protection circuit.

3. The charge controller with a protection function according to claim 1, wherein the charge control circuit and the protection circuit are formed as a semiconductor integrated circuit on one semiconductor chip.

4. A battery pack, comprising:
the charge controller according to claim 1; and
a battery cell connected to the charge controller,
wherein the charge controller and the battery cell are accommodated in one case.

* * * * *